United States Patent [19]

Mallon

[11] Patent Number: 4,481,080

[45] Date of Patent: Nov. 6, 1984

[54] STAGED FLUIDIZED BED

[75] Inventor: Richard G. Mallon, Livermore, Calif.

[73] Assignee: The United States of America as represented by the United States Department of Energy, Washington, D.C.

[21] Appl. No.: 494,236

[22] Filed: May 13, 1983

[51] Int. Cl.³ ............................ B01J 8/26; B01J 8/32; C10B 49/22; C10B 53/06
[52] U.S. Cl. ......................................... 201/31; 34/10; 201/32; 208/11 R; 432/15; 432/17
[58] Field of Search ...................... 201/26, 31, 32, 41; 34/10; 432/15, 17; 208/11 R; 422/142

[56] References Cited

U.S. PATENT DOCUMENTS 2,573,906 11/1951 Huff .
2,717,869  9/1955 Turner .
3,360,867  1/1968 Sanderson ............................... 34/10
3,384,569  5/1968 Peet .
3,902,856  9/1975 Burroughs et al. ................. 422/142
4,012,311  3/1977 Greene .
4,145,274  3/1979 Green et al. ....................... 208/11 R
4,199,432  4/1980 Tamm et al. ....................... 208/11 R
4,332,669  6/1982 Spars et al. ....................... 208/11 R
4,336,127  6/1982 Bertelsen .......................... 208/11 R
4,336,128  6/1982 Tamm .............................. 208/11 R
4,405,339  9/1983 Kunii ..................................... 201/31

FOREIGN PATENT DOCUMENTS 659213 10/1951 United Kingdom ................. 201/31

Primary Examiner—Bradley Garris
Attorney, Agent, or Firm—Henry P. Sartorio; Harold M. Dixon; Michael F. Esposito

[57] ABSTRACT

Method and apparatus for narrowing the distribution of residence times of any size particle and equalizing the residence times of large and small particles in fluidized beds. Particles are moved up one fluidized column and down a second fluidized column with the relative heights selected to equalize residence times of large and small particles. Additional pairs of columns are staged to narrow the distribution of residence times and provide complete processing of the material.

3 Claims, 5 Drawing Figures

STAGED FLUIDIZED BED

The United States Government has rights in this invention pursuant to Contract No. W-7405-ENG-48 between the U.S. Department of Energy and the University of California, for the operation of Lawrence Livermore National Laboratory.

BACKGROUND OF THE INVENTION

The invention relates to oil shale retorting and more particularly to staged fluidized bed oil shale retorting.

Retorting of oil shale can be produced in a fluidized bed in which raw shale particles are continuously fed into the top of a column, gas is forced up through the bed of small shale particles which behave as a viscous liquid and heat is added to produce pyrolysis. At any particular temperature a fixed time is required for complete pyrolysis so, ideally, each particle should remain in the bed for the same length of time. In an "ideally mixed" fluidized bed the temperature, pressure and composition of the material is the same throughout. The actual residence time, however, even for uniform sized particles, shows a wide distribution about the average time. The use of staging, passing through a series of vessels in sequence, narrows the distribution of residence time; generally 4-6 stages are considered sufficient.

However, particles from a crusher have a wide range of size. For the larger and heavier particles a higher gas velocity is required to fluidize the bed. But if the heavier particles are fluidized, the lighter particles are swept up by the gas flow, introducing a loss. If a lower gas velocity is used, the larger, heavier particles will sink through the fluid so their residence time is shorter. Ideally the residence time is identical for all particles in the bed.

U.S. Pat. No. 4,199,432 to Tamm, et al., issued Apr. 22, 1980 shows a staged turbulent bed retorting process which utilizes a partially fluidized bed which behaves as a serial plurality of stages. By utilizing this configuration to achieve staging, the small particles all have approximately the same residence time. Baffles, e.g., horizontally disposed perforated plates, are placed in the column to slow down the larger unfluidized particles so their residence is about 50-90 percent of the average residence time for all particles passing through the retort.

U.S. Pat. No. 2,717,869 to Turner, issued Sept. 13, 1955 shows a fluidized bed retort with horizontal baffles to prevent shale particles from falling freely through the bed and, thus, to increase the retorting time.

U.S. Pat. No. 4,336,128 to Tamm, issued June 22, 1982 shows a staged turbulent bed process in which the retort column has multiple perforated horizontal plates to serve as dispersing elements. The system also contains a combustion chamber with multiple perforated horizontal plates as dispersing elements to limit backmixing, limit slugging and increase residence time of non-fluidizable coarse particles passing through the chamber. The dispersing elements increase the residence time of non-fluidizable particles to about 50-90 percent of the average residence time for all particles. U.S. Pat. Nos. 4,336,127 to Bertelsen and 4,332,669 to Spars, et al., also show retorts having horizontal barriers, baffles, dispersers or flow redistributers which include spaced horizontal perforated plates, bars, screens, packing or other suitable internals.

U.S. Pat. Nos. 4,145,274 to Green, et al., 4,102,311 to Greene, 3,384,569 to Peet and 2,573,906 to Huff show a variety of processes in which the material goes through a series of separate processing zones.

Accordingly, it is an object of the invention to equalize the residence time for different size particles in a fluidized bed.

It is also an object of the invention to produce a narrow distribution of residence time for particles of any particular size in a fluidized bed.

It is another object of the invention to provide method and apparatus for oil shale retorting in a fluidized bed in which oil shale particles of various sizes remain in the fluidized bed for sufficient time for complete pyrolysis to occur.

SUMMARY OF THE INVENTION

The invention is a method of staging a fluidized bed of oil shale particles by passing the particles sequentially, but in alternately opposite directions, through a series of adjacent fluidized columns by passing the particles up one column and down the other of a pair of columns. The differences of speeds of the large and small particles are balanced so the residence times are equalized. The larger particles fall through the first column faster than the smaller particles but move upwards through the second column slower than the smaller particles. The relative heights of the two columns can be adjusted to equalize the residence times of different size particles. The process can be repeated through additional pairs of staged columns to narrow the distribution of residence time for any particular size particle. In one embodiment, the fluidized bed vessel comprises a tank, preferably of a slab geometry, divided into two adjacent halves by a baffle extending down near the bottom of the tank, leaving an opening at the bottom between the adjacent halves of the tank. Raw shale is input at the top on one side of the baffle and passes down around the baffle and up the other side to the top of the tank. In a second embodiment, the fluidized bed vessel comprises a tank divided in half by a center wall. Raw shale is injected into the bottom of one side of the tank and passes to the top and over the center wall into the top of the second half to pass down to the bottom. In both embodiments, the heights of the fluidized beds in the two sides of the tank can be adjusted so the residence time for large and small particles will be the same. Successive tanks can be staged to provide complete pyrolysis of the shale.

DETAILED DESCRIPTION OF THE PREFERRED EMBODIMENTS

Figure 1:
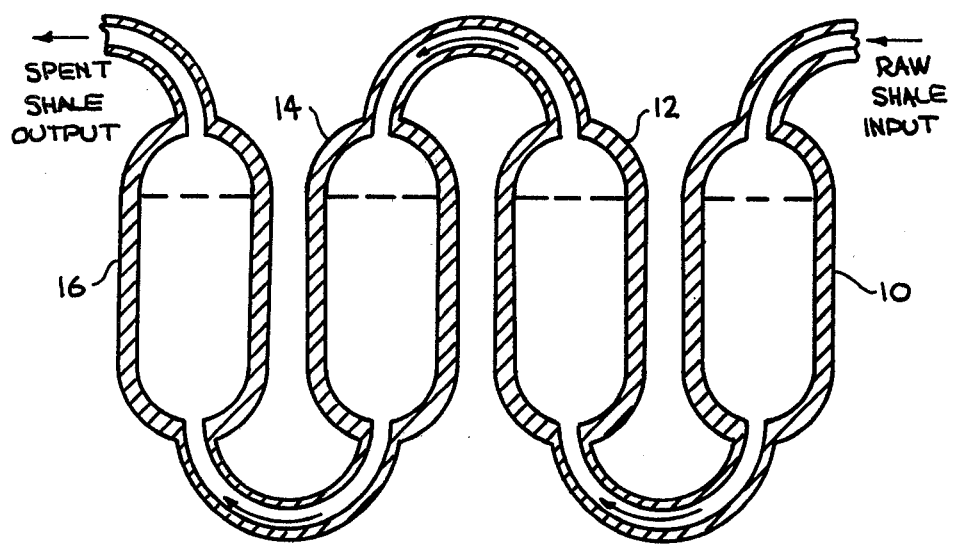
FIG. 1 is a schematic diagram of the alternate up and down flow of oil shale particles through a series of fluidized beds to equalize residence time of large and small particles.

The invention utilizes both staging of fluidized beds to narrow the distribution of residence time of particles in the fluidized bed, and paired upward and downward flow through adjacent stages in order to equalize the residence times of small and large particles in the fluidized bed. As illustrated schematically in FIG. 1 for four columns, raw shale is input at the top of the first fluidized bed column 10. The larger particles of shale fall through column 10 faster than the smaller particles. The shale particles removed from the bottom of column 10 are then input into the bottom of adjacent fluidized column 12 and move upwards through column 12. The larger particles move up through column 12 slower than the smaller particles. By adjusting the heights of the fluidized beds in columns 10 and 12 the residence times of the larger particles in the pair of column 10 and 12 will be the same as for the smaller particles. Thus by utilizing a fluidized bed configured into a pair of adjacent columns in which the flow is successively in the upward or in the downward direction the velocity differences of different sized particles in each of the columns will offset, and the residence times through the pair of columns will be equal. Thus, each column can be operated under normal conditions. The fluidizing gas velocity in column 10 can be adjusted to fully fluidize the smaller particles while allowing the larger particles to drop through more rapidly. It is unnecessary to try to increase the residence time of the larger particles in column 10, e.g., by increasing the fluidizing gas velocity which would cause a loss of the smaller sized particles, since this difference in residence between the large and small particles in column 10 is cancelled out by the reverse flow in column 12. Under normal fluidized bed operating conditions in column 12, the larger particles will move up slower than the smaller particles and by proper choice of the relative heights between columns 10 and 12, the residence times of large and small particles in the pair of columns are approximately equalized.

Additional pairs of staged columns, e.g., columns 14 and 16, can be utilized to complete the process. The shale particles taken from the top of column 12 are input at the top of column 14 wherein the larger particles will fall faster than the smaller particles. The shale particles are then removed from the bottom of column 14 and input at the bottom of column 16. In this reverse flow, the larger particles will move up more slowly than the smaller particles. Again by selection of the proper relative heights between columns 14 and 16, the residence times of the larger and smaller particles in the pair of columns 14 and 16 can be equalized. Additional pairs of columns can be utilized; the total number of columns will always be an even number, since pairs of columns are utilized to equalize residence times. The total number of columns will be determined by the total residence time required for complete pyrolysis of the oil shale and by the number of stages necessary to produce a sufficiently narrow distribution of residence times for any particular size particle. Typically, four or six stages are sufficient to narrow the residence time distributions. Thus, the invention, by staging a series of columns, narrows the residence time distribution for both large and small particles, and by utilizing the alternate up and down flow makes the residence distributions for large and small sized particles coincide.

Figure 2A:
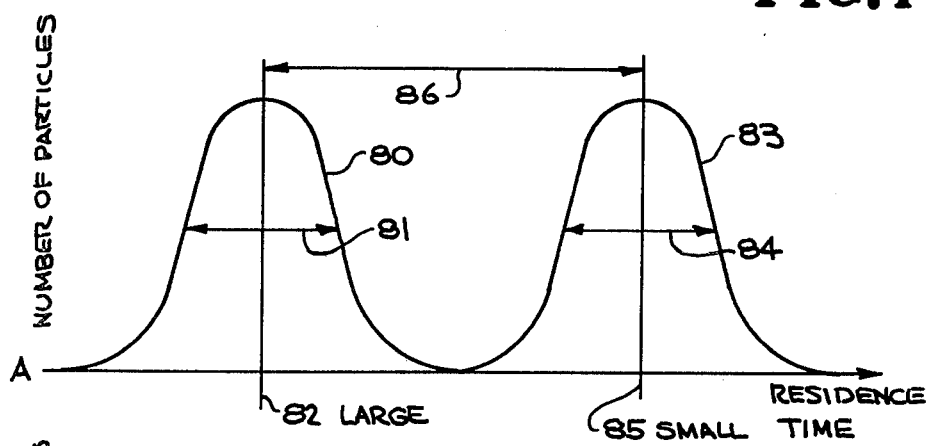
FIGS. 2A and B shows the changes in residence time of particles in a fluidized bed produced by the invention.
Figure 2B:
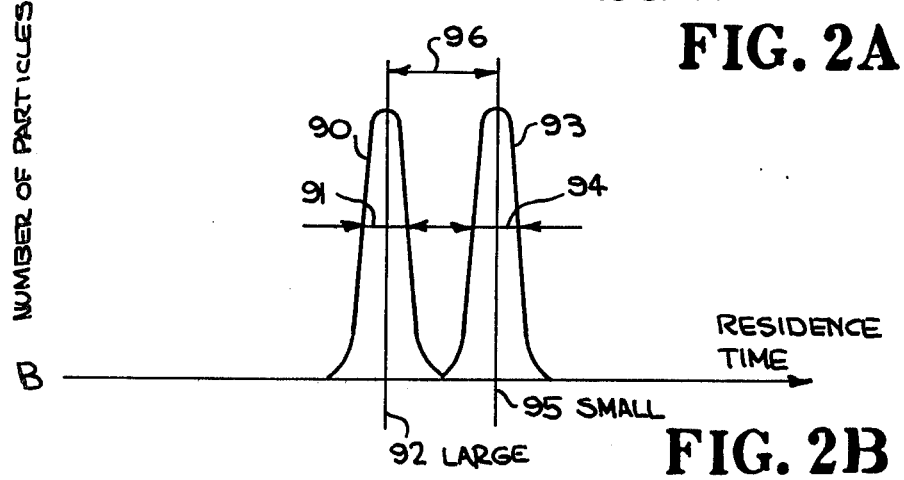

The effect on particle residence time according to the invention is illustrated in FIG. 2 which shows the distribution of particle residence times. In prior art fluidized beds, shown in FIG. 2A, particles of a particular large size have a distribution 80 having a half width 81 around residence time 82 while particles of a particular smaller size have a distribution 83 with a half width 84 around residence time 85. Particles of other intermediate sizes will have similar distributions located between the illustrative distributions. The difference 86 between residence times 82 and 85 is relatively large. Prior art methods utilized staging to reduce the widths 81 and 84 and baffling techniques to attempt to reduce the difference 86 in residence times between large and small particles. However, prior art methods generally achieve residence time of larger particles of 50-90 percent the residence time of smaller particles. Utilizing the principles of the invention the results illustrated in FIG. 2B can be obtained. The larger size particle has a distribution 90 with a half width 91 about a residence time 92. The smaller size particle has a distribution 93 with a half width 94 about a residence time 95. By means of staging the widths of the distributions 91 and 94 are greatly reduced. By utilizing the paired alternating flows, the residence times 92 and 95 are nearly identical, i.e., the difference 96 in residence times is very small.

Figure 3:
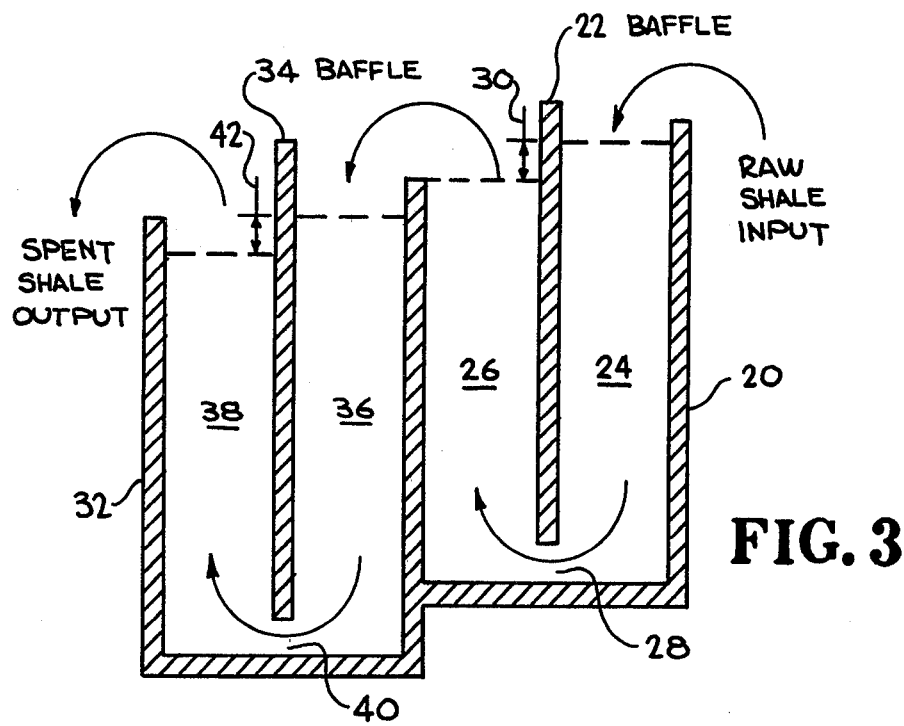
FIG. 3 shows a schematic diagram of a U-shaped (or top driven) arrangement of a fluidized bed divided into two adjacent columns.

One embodiment of the invention, the top driver embodiment shown schematically in FIG. 3, has a fluidized bed vessel which comprises a tank 20 divided by baffle 22 into two adjacent columns 24 and 26. The tanks are preferably of a slab geometry, typically 10 meters high by 5 meters wide with length determined by production requirements, possibly as much as 50 meters. The necessary conventional means for fluidizing the bed, including compressors and blowers, as well as the necessary conventional product recovery means, are operatively connected to tank 20. The tank 20 is divided by the baffle 22 which extends down through tank 20 to a depth near the bottom leaving an opening 28 connecting adjacent columns 24 and 26. Raw shale is input at the top of column 24 on one side of baffle 22 in tank 20 and passes down around baffle 22 through opening 28 and up column 26 on the other side of the baffle 22. As previously described, the larger particles fall more rapidly through column 24 but move upward more slowly through column 26. The difference 30 in heights of the fluidized beds on the two sides of the baffle 22 is selected so that the residence time for the large and small particles in tank 20 will be the same. The difference 30 in the heights of the beds will depend on the depth of the baffle 22 in tank 20.

The process is continued in successive tanks, e.g., tank 32, for complete pyrolysis of the shale. The shale particles removed from the top of column 26 of tank 20 are input into the top of column 36 of tank 32. The tank 32 is divided by baffle 34 into adjacent columns 36 and 38 with the baffle 34 extending down into tank 32 near the bottom, leaving an opening 40 between the adjacent columns 36 and 38. The shale particles input at the top of column 36 move down column 36 around the end of baffle 34 through the opening 40 and up column 38. The difference 42 in the heights of the fluidized beds in columns 36 and 38 is chosen to equalize the residence times of large and small particles in tank 32. The staging of tanks 20 and 32 produces the total residence time needed for complete pyrolysis of the shale and reduces the residence time distribution of any size particle. Each tank is divided by a baffle to reverse the flow in the two halves of the tank so that the residence times of large and small particles therein are equalized.

Figure 4:
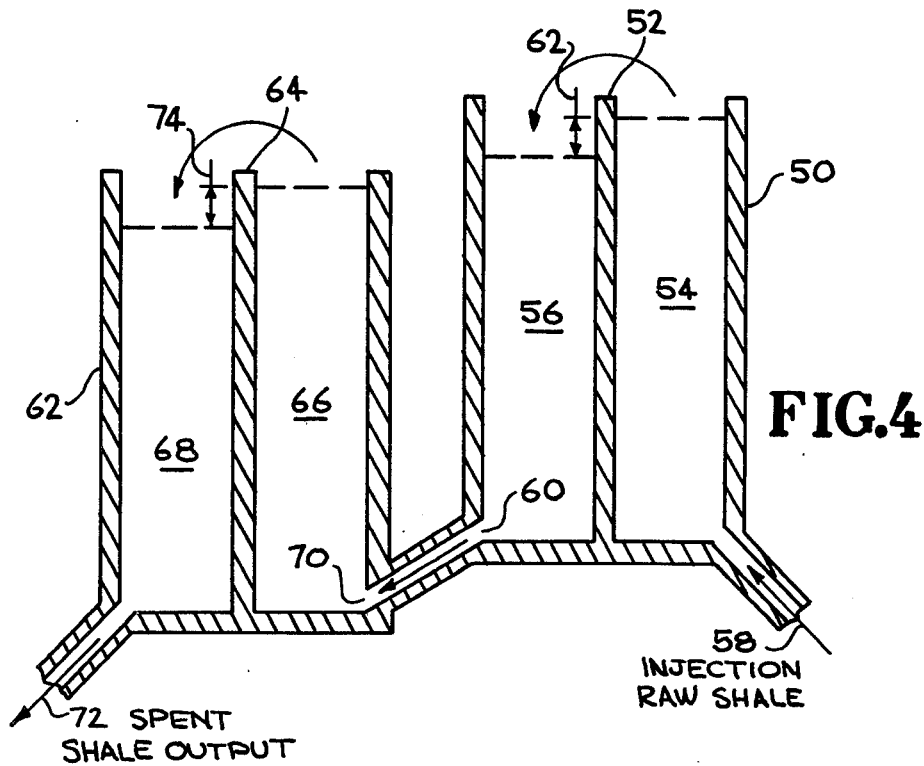
FIG. 4 is a schematic diagram of an inverted U-shaped (or bottom driven) arrangement of a fluidized bed divided into two adjacent columns.

In a second embodiment shown schematically in FIG. 4 the fluidized beds are driven from the bottom rather than the top as illustrated in FIG. 3. Tank 50 is divided in half by a center wall 52 extending from the bottom of tank 50 producing adjacent columns 54 and 56. The tank is again preferably of a slab geometry, typically 10 meters high by 5 meters wide with length determined by production requirements, possibly as much as 50 meters. Raw shale is injected through inlet 58 into the bottom of column 54 of tank 50. Shale passes to the top of column 54 and over the center wall 52 into the top of the column 56 where the shale moves down to the bottom. In this situation the residence time of the larger particles is longer in column 54 but is shorter in column 56. By proper choice of the difference 62 in heights of the fluidized bed on both sides of wall 52 the residence times of large and small particles can be equalized. As shown, particles are removed from the bottom of column 56 through outlet 60 and input through inlet 70 into the bottom of column 66 of tank 62. The tank 62 is similarly divided by center wall 64 into adjacent columns 66 and 68. The shale flow is up through column 66 over the center wall 64 into column 68 and down through column 68 where it can be removed through outlet 72. The difference 74 in the heights of the fluidized beds in columns 66 and 68 is chosen to equalize the residence times of large and small particles. The principle of staging tanks, each tank being a dual vessel with alternate flows on the two sides of a center wall, is utilized for complete pyrolysis and to narrow the distribution of particle residence time.

Changes and modifications in the specifically described embodiments can be carried out without departing from the scope of the invention which is intended to be limited only by the scope of the appended claims.

I claim:

1. A method for substantially equalizing the residence times of large and small particles in a fluidized bed comprising passing the particles through a first fluidized bed column from top to bottom and passing the particles through a second fluidized bed column from bottom to top, the heights of the fluidized beds in the columns being selected and maintained to substantially equalize the residence times of the large and small particles in the pair of columns.

2. The method of claim 1 further comprising passing the particles through at least one additional pair of similar columns.

3. The method of claim 2 wherein the particles are oil shale particles and the number of pairs of columns is sufficient to provide a total residence time for complete pyrolysis of the oil shale.

* * * * *